TELEVISION RECEIVER NOISE REDUCTION

Filed Aug. 2, 1954

INVENTOR.
LUCIUS P. THOMAS, JR.
BY
ATTORNEY

United States Patent Office 2,829,247

Patented Apr. 1, 1958

2,829,247

TELEVISION RECEIVER NOISE REDUCTION

Lucius Ponder Thomas, Jr., West Collingswood, N. J., assignor to Radio Corporation of America, a corporation of Delaware Application August 2, 1954, Serial No. 447,080

The terminal fifteen years of the term of the patent to be granted has been disclaimed 6 Claims. (Cl. 250—20)

The invention relates to television receiver circuit arrangements and it particularly pertains to such circuit arrangements for reducing noise in the extrawhite or whiter-than-white region of the video signal as applied to the image reproducing device.

The random noise which may accompany the video signal when the signal level is higher than that which represents a white area on the image or in the whiter-than-white region is extremely disconcerting to the televiewer. The "noise" appears as fine, closely-packed black and white spots in relatively rapid random motion analogous to the hissing sound of random noise in an aural system and similar in appearance to a swirling snow storm.

In order to overcome such excess noise or "snow" effect, strict attention is paid to the design of the radio frequency R.-F. circuits in order to achieve as high a signal to noise ratio as possible. However, some noise will still prevail at the output of the video amplifier, especially in weak signal areas.

An object of the invention is to provide an improved circuit arrangement for reducing "snow" or whiter-than-white noise which is visible on the face of the kinescope of a television receiver.

Another object of the invention is to provide a television circuit arrangement for reducing noise at the output of the video amplifier circuit and visible on the face of a kinescope.

A further object of the invention is to provide a television circuit arrangement in which the degree of noise reduction in the whiter-than-white region is adjustable.

The objects of the invention are attained in a video amplifier circuit arrangement for a television receiving circuit arrangement including an electron discharge device of the type having a screen grid. The video signal is applied to a signal input circuit which is connected between the control grid and a point of fixed reference potential to which the cathode of the electron discharge device is connected at the video frequency. The video signal is amplified and reproduced in a signal output circuit connected between the anode of the electron discharge device and the point of fixed reference potential, which output circuit is preferably arranged for direct coupling to the grid-cathode circuit of the kinescope. The screen grid is connected through a resistive element to a source of positive operating potential and bypassed at the video frequencies to the point of fixed reference potential by capacitive reactance means of conventional value which is connected to the screen grid by means of a unilateral impedance device. Preferably, the unilateral impedance device is in the form of a diode element for which the necessary D. C. path is completed by means of a resistive device shunting the capacitive reactance bypass means and having a value at which the combination has a time constant about 100 times the period of the lowest frequency to be amplified.

According to the invention, the unilateral impedance device, or diode, is arranged to conduct to couple the bypass capacitive reactance between the screen grid and the point of reference potential for all values of the video signal between the black level and toward the white level. On excursions of the video signal beyond the white representative signal range the unilateral impedance device, or diode element, is arranged to cease conduction and automatically remove the screen bypass capacitive reactance from the screen grid. The video amplifier tube now functions in a sense as a triode and the noise in the extrawhite region is attenuated. In this manner the gamma factor of the video amplifier is automatically changed by introducing degeneration into the video amplifier circuit to reduce the noise in the whiter-than-white or extrawhite region.

In a more elaborate embodiment of the invention a multi-position switching device is used selectively to couple a capacitive reactance element, of substantially the same value as the bypass element to a plurality of points on the screen grid dropping resistance element to provide varying degrees of "snow" reduction, since full noise compression is not desirable on strong signals because the information near the white level is reduced to an undesirable extent.

In order that the invention may be readily applied in practice, detailed descriptions of specific embodiments thereof are given below by way of example only, with reference to the accompanying drawing forming a part of the specification and in which.

Figures 1, 2:
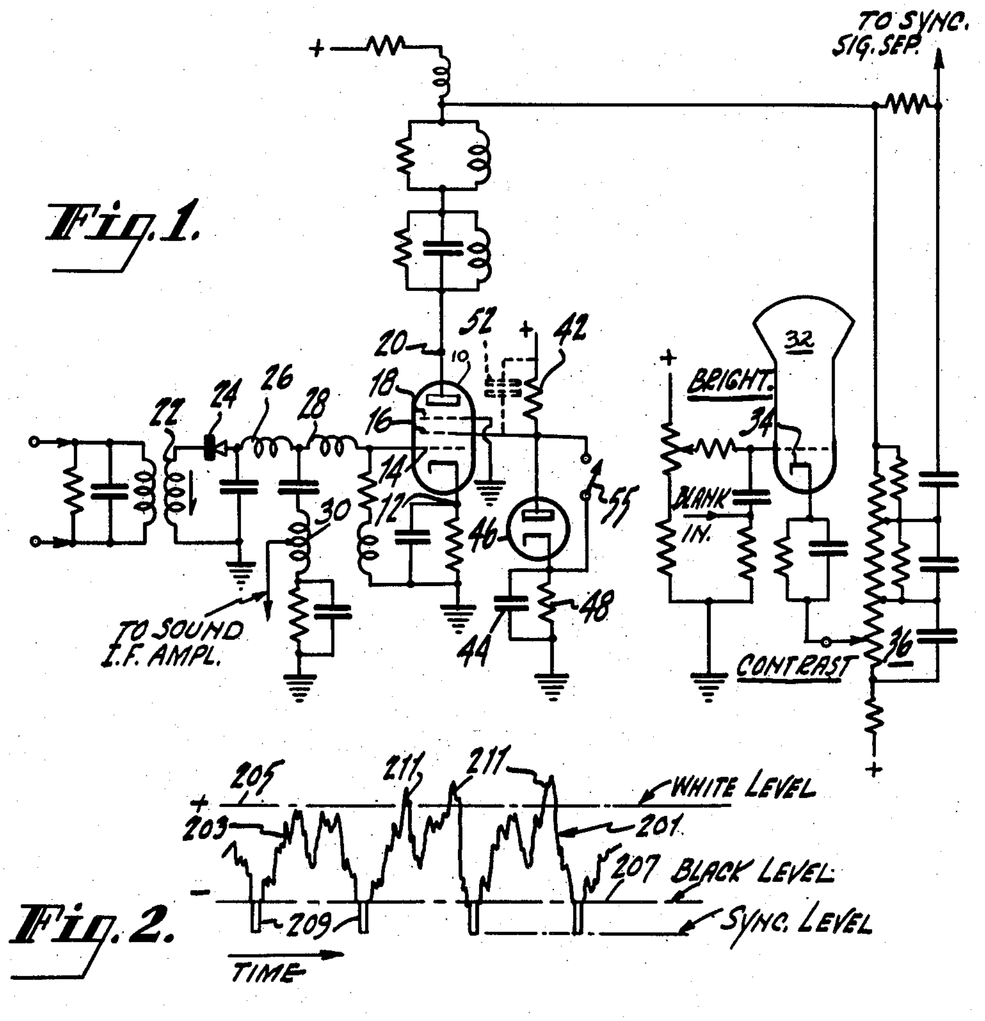
Fig. 1 is a schematic diagram of a conventional video amplifier modified in accordance with the teachings of the invention.
Fig. 2 is a graphical representation of a television signal waveform useful in the explanation of the invention.

Referring to Fig. 1 there is shown a schematic diagram of a video amplifier circuit of a television receiving circuit arrangement, comprising an electron discharge device in the form of a pentode vacuum tube 10 having a cathode connected to a cathode lead 12, a control grid 14, a screen grid 16, a suppressor grid 18, and an anode connected to an anode lead 20. The video signal to be amplified is obtained from an intermediate frequency amplifier channel and induced in the winding 22 of a demodulator circuit comprising a detector element 24 which is directly coupled by means of a pair of peaking coils 26, 28 to the signal input circuit of the video amplifier tube 10 at the control grid 14. The circuit arrangement as shown is for intercarrier type of television receiver circuit in which both picture and sound signals are amplified in a common I.-F. channel and the sound signal is taken off by means of a sound trap 30 leaving video signals only applied to the control grid 14. Obviously the older type circuit having a separate picture I.-F. amplifier and detector could be used as well. The output circuit of the video amplifier is directly coupled to the grid-cathode circuit of a kinescope 32 by connections between the anode lead 20 and the cathode 34, so that the need for a D. C. restorer is eliminated. Multiple anode voltage feed on the video amplifier tube 10 allows the use of a frequency compensated contrast control 36 so that the gain of the video amplifier circuit is unaffected by any adjustment of the video signal to the kinescope 32.

According to the teaching of the prior art, the video amplifier circuit shown in Fig. 1 would have the screen grid 16 connected to the point of positive direct operating potential by means of a resistive element 42 and a bypass capacitor connected between the screen grid and the point of reference potential, usually ground. In the usual practice an electrolytic bypass capacitor of approximately 10 mfd. would be shunted by a mica capacitor of approximately 100 mmfd. to provide a sufficiently low impedance to high frequency components of the signal around the relatively high inductive reactance of the electrolytic capacitor at these high frequency components.

According to the invention the screen grid 16 is bypassed by means of a capacitive reactance element in the form of a fixed capacitor 44 which is coupled by means of a unilateral impedance device in the form of a diode element 46. The necessary D. C. path for the diode element 46 is furnished by a resistive device 48 shunting the fixed capacitor 44. The resistor 48 preferably has a value which, in conjunction with the value of the capacitor 44, will provide a network of time constant of about three seconds so that the potential at the cathode of the diode element 46 remains substantially constant with respect to the signal variations at the lowest frequency of interest, which in the case of video frequency signals is 30 cycles per second.

In the event that the stray capacity of the video amplifier screen grid circuit is insufficient the response of the circuit will not be sufficiently flat over the desired frequency range. In this case, a fixed capacitor 52 may be connected as shown.

A simple switching device 55 is connected to the diode 46 to short-circuit the same when the noise reducing circuit arrangement is not necessary. This switching device 55 connects the bypass capacitor 44 directly to the screen grid for all frequencies translated by the video amplifier tube 10.

Referring to Fig. 2 a graphical representation of a typical composite video signal as applied to the grid 14 of the video amplifier tube 10 is given by the entire curve 201. The portion of the curve 203 represents the video information between the white level indicated by the line 205 and the black level indicated by the line 207. The black level corresponds to the potential which when applied to the cathode 34 of the kinescope 32 serve to cut the kinescope off. The portion of the curve 209 represent the synchronizing pulses which do not appear in the image reproduced by the kinescope 32 because these pulses are beyond cutoff, or in the blacker-than-black or infrablack region. For all signal levels between the line 205 and the line 207 the diode 46 is conducting and the screen grid 16 of the video amplifier 10 is effectively bypassed in substantially the usual manner. As the potential on the grid 14 swings more positive toward the line 205 of the wave as shown in Fig. 2 the potential at the anode lead 20 and the screen grid 16 drops lower and lower until the potential on the screen grid 16 becomes very close to the potential across the bypass capacitor 44. Since the time constant of the circuit comprising the bypass capacitor 44 and the shunt resister 48 is large, the potential across the capacitor remains substantially constant, and as the voltage on the grid 14 approaches the white level as represented by the line 205 or goes beyond into the whiter-than-white region as represented by the portions of the curve 211, the diode element 46 ceases to conduct because the anode is less positive than the cathode. In this manner the bypass capacitor 44 is effectively decoupled from the screen grid thereby rendering the amplifier circuit degenerative to reduce the gain and thereby substantially eliminate translation of the noise pulses as represented by the portion of the curve 211. It should be understood that the circuit arrangement according to the invention does not clip the video signal in a strict sense but automatically removes the screen bypass and varies the gamma factor of the circuit to substantially eliminate noise near the zero carrier or white level.

It is convenient in television work, both in monochrome and full color to express the operation of the video amplifier stage in terms of the formula:

$$E_0 = kE_i$$

because it is expressed in the same form as a similar equation used in photographic reproduction, wherein the value of gamma is determined from the slope of the curve expressing the relationship between the visual response of the eye and the brightness of the image. This relationship is of course a part and parcel of the problem involved in the design of the video circuits of a television receiver. Thus it is seen that the circuit arrangement of the invention may be considered as a control circuit for automatically varying the gamma factor of the video amplifier in response to received noise pulses.

Figure 3:
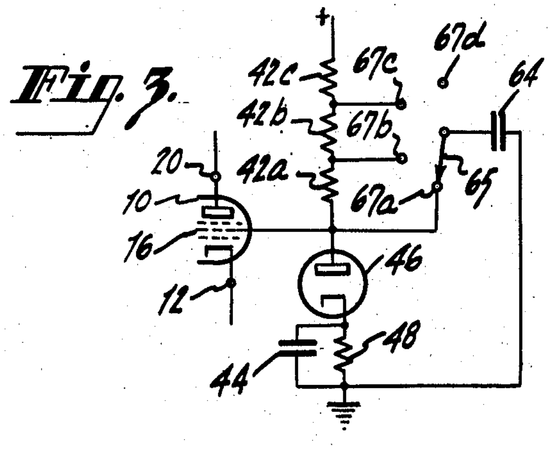
Fig. 3 is a schematic diagram of an alternate form of circuit arrangement according to the invention.

Referring to Fig. 3 there is shown a more elaborate embodiment of the invention wherein the effectiveness of the gamma control is adjustable in a number of steps. The screen grid circuit of Fig. 3 is substituted for that of the arrangement of Fig. 1 between the anode and cathode leads 12 and 20 and differs mainly in that an additional bypass capacitor 64 is connected by means of a switching device having an arm 65 and a plurality of contacts **67*a*–67*d* to vary the effectiveness of the automatic gamma control. With the arm 65 on the contact 67*a* the screen grid 16 is substantially completely by passed by the additional capacitor 64 so that the gamma control circuit is substantially short-circuited and therefore ineffective. With the arm 65 on the contacts 67*b* and 67*c* successively increasing automatic gamma control is obtained and with the arm on the contact 67*d***, which is not connected into the circuit in any way, the automatic gamma control circuit is fully effective. This elaboration is highly desirable for television receivers which are located in strong signal areas, as full noise or "snow" compression is not desirable on strong signals, inasmuch as the information in the white region is thereby undesirably reduced.

It is also suggested that in either of the embodiments shown in Figs. 1 and 3, the point at which the diode element 46 ceases conduction may be more rigidly set by connecting a resistive element between the cathode of the diode element 46 and a point of positive operating potential.

In practical application of the invention the listed values of pertinent component parts were used:

| Ref. No. | Component | Value or Types |
|---|---|---|
| 10 | Video amplifier tube | 6AG7. |
| 42 | Screen resistor | 18 kilohms. |
| 42*a* | Screen resistor element | 3,300 ohms. |
| 42*b* | do | Do. |
| 42*c* | do | 12 kilohms. |
| 44 | Capacitor | 10 mf. |
| 46 | Diode element | 1N34. |
| 48 | Resistor | 330 kilohms. |
| 64 | Capacitor | 10 mf. |

In the arrangements shown approximately 4½ volts peak-to-peak input signal is delivered by the detector element from which approximately 120 volts peak-to-peak signal is produced in the output circuit of the video amplifier for application to the kinescope. The power supply used furnished 265 volts positive with respect to ground at the points marked with the plus (+) sign.

Obviously, other values will be suggested to those skilled in the art when applying the invention to other circuit arrangements.

The invention claimed is:

1. A television receiving circuit arrangement including a video amplifier circuit comprising an electron discharge device having a screen grid, a resistive device connected between said screen grid and a point of fixed positive potential with respect to a point of reference potential, signal bypass means having one terminal connected to said point of fixed reference potential, a unilateral conducting device having an anode connected to said screen grid and a cathode connected to said bypass means, a switching device having an arm and plurality of contacts, one of said contacts being connected to said screen grid, and others being connected to points on said resistive device, and a capacitive element connected between said arm and said point of fixed reference potential.

2. A television receiving circuit arrangement including a video amplifier circuit comprising an electron discharge device having at least a cathode, a control grid, a screen grid and an anode, a signal input circuit coupled between said control grid and said cathode, a signal output circuit coupled between said anode and said cathode, means to apply positive operating potential to said screen grid, bypass means for said screen grid comprising a capacitive reactance element shunted by a resistive device and connected to the cathode of said electron discharge device, and a unilateral impedance device having a cathode connected to said bypass means and an anode connected to said screen grid to decouple said bypass means from said screen grid upon anode, cathode and screen current excursions above a predetermined level.

3. A television receiving circuit arrangement including a video amplifier circuit comprising an electron discharge device having at least a cathode, a control grid, a screen grid, and an anode, a signal input circuit coupled between said control grid and said cathode, a signal output circuit coupled between said anode and said cathode, a resistor to apply positive operating potential to said screen grid, a bypass capacitor having one terminal connected to the cathode of said electron discharge device and another terminal, a diode element having one electrode connected to the other terminal of said capacitor and the other electrode connected to said screen grid to decouple said capacitor from said screen grid upon anode-cathode and screen current excursions above a predetermined level, thereby to change the amplification factor of said video amplifier circuit.

4. A television receiving circuit arrangement as defined in claim 3 and incorporating a further capacitor connected between the cathode of said electron discharge device and one of a plurality of points on said resistor.

5. A television circuit arrangement including a wave translating circuit comprising an electron discharge device having a cathode, a control grid, a screen and an anode, a signal input circuit coupled between said cathode and said control grid, a signal output circuit coupled between said anode and said cathode, means to apply positive operating potential to said screen grid, a unilateral conducting device having an anode connected to said screen grid and a cathode, and signal bypass means connected between the cathodes of said electron discharge device and said unilateral conducting device.

6. A television receiving circuit arrangement including in combination, a video amplifier circuit comprising an electron discharge device having at least a cathode, a control grid, a screen grid and an anode, a signal input circuit coupled between said control grid and said cathode, a signal output circuit coupled between said anode and said cathode, means to apply positive operating potential to said screen grid, a capacitor having two electrodes, a resistor shunting said capacitor, a diode element having one electrode connected to one electrode of said capacitor to form a series circuit, the other electrodes of said capacitor and said diode elements being connected individually to the screen grid and cathode of said electron discharge device to decouple said capacitor from said screen grid upon anode and screen current excursions above a predetermined level.

References Cited in the file of this patent

UNITED STATES PATENTS

| | | |
|---|---|---|
| 2,095,261 | McCaa | Oct. 12, 1937 |
| 2,171,636 | Seeley | Sept. 5, 1939 |
| 2,305,842 | Case | Dec. 22, 1942 |

FOREIGN PATENTS

| | | |
|---|---|---|
| 676,786 | Great Britain | Aug. 6, 1952 |